(12) United States Patent
Garner et al.

(10) Patent No.: US 8,269,138 B2
(45) Date of Patent: Sep. 18, 2012

(54) METHOD FOR SEPARATING A SHEET OF BRITTLE MATERIAL

(75) Inventors: Sean Matthew Garner, Elmira, NY (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 698 days.

(21) Appl. No.: 12/469,794

(22) Filed: May 21, 2009

(65) Prior Publication Data
US 2010/0294748 A1 Nov. 25, 2010

(51) Int. Cl.
*B23K 26/00* (2006.01)
(52) U.S. Cl. ............... 219/121.69; 65/112; 225/93.5
(58) Field of Classification Search ........... 219/121.68, 219/121.69; 65/112; 438/463
See application file for complete search history.

(56) References Cited

U.S. PATENT DOCUMENTS

| | | | | |
|---|---|---|---|---|
| 4,580,336 A * | 4/1986 | Kerley et al. | ........... | 29/605 |
| 5,294,811 A * | 3/1994 | Aoyama et al. | ........... | 257/59 |
| 5,585,020 A * | 12/1996 | Becker et al. | ........... | 219/121.85 |
| 5,609,284 A | 3/1997 | Kondratenko | ........... | 225/1 |
| 5,622,540 A | 4/1997 | Stevens | ........... | 65/112 |
| 5,776,220 A | 7/1998 | Allaire et al. | ........... | 65/112 |
| 5,916,460 A * | 6/1999 | Imoto et al. | ........... | 219/121.67 |
| 6,306,510 B1 * | 10/2001 | Verlinden et al. | ........... | 428/426 |
| 6,634,186 B2 * | 10/2003 | Abe | ........... | 65/105 |
| 6,657,723 B2 * | 12/2003 | Cohen et al. | ........... | 356/328 |
| 6,811,069 B2 | 11/2004 | Hauer et al. | ........... | 225/93.5 |
| 7,014,082 B2 | 3/2006 | Hauer et al. | ........... | 225/93.5 |
| 2004/0041158 A1 * | 3/2004 | Hongo et al. | ........... | 257/79 |
| 2005/0115678 A1 | 6/2005 | Vesci et al. | ........... | 156/345.49 |
| 2007/0039932 A1 | 2/2007 | Haase et al. | ........... | 219/121.67 |
| 2007/0062921 A1 | 3/2007 | Karube et al. | ........... | 219/121.72 |
| 2007/0151962 A1 | 7/2007 | Doll et al. | ........... | 219/121.72 |
| 2007/0170162 A1 * | 7/2007 | Haupt et al. | ........... | 219/121.72 |
| 2009/0040640 A1 * | 2/2009 | Kim et al. | ........... | 359/894 |

FOREIGN PATENT DOCUMENTS

| | | |
|---|---|---|
| EP | 1341730 | 12/2001 |
| GB | 1254120 | 11/1971 |
| JP | 2002-192367 | 7/2002 |
| JP | 2003-002676 | 1/2003 |
| JP | 2007-319888 | 12/2007 |
| WO | WO2005/115678 | 12/2005 |
| WO | WO2007/079847 | 7/2007 |

OTHER PUBLICATIONS

K. Karube, N. Karube, "Laser-induced cleavage of LCD glass as full-body cutting", Proc. SPIE, vol. 6880, 688007-1 to 688007-10 (2008).

* cited by examiner

*Primary Examiner* — Samuel M Heinrich
(74) *Attorney, Agent, or Firm* — Kevin M. Able

(57) ABSTRACT

A method for separating sheet of brittle material having a thickness equal to or less than about 1 mm is disclosed. Once an initial flaw or crack is produced, a full body crack can be propagated across a dimension of the brittle material with a laser beam that is substantially absorbed proximate the surface of the sheet to produce sub-sheets. In some embodiments, only a single pass of the laser beam over a surface of the sheet is necessary to separate the sheet. In other embodiments a plurality of passes may be used. Sub-sheets can be further processed into electronic devices by depositing thin film materials on the sub-piece.

20 Claims, 5 Drawing Sheets

METHOD FOR SEPARATING A SHEET OF BRITTLE MATERIAL

TECHNICAL FIELD

This invention is directed to a method of separating a sheet of brittle material, and in particular, full-body cutting of a thin sheet of brittle material.

BACKGROUND

Conventional laser-cut glass can have a high median strength, typically better than 400 MPa. For comparison, the median strength of mechanically cut edges is roughly 100 MPa or less. However, the Weibull modulus, or "shape factor", m, for laser cut samples is low. A typical shape factor for samples prepared by conventional laser scoring, followed by a score and bend method for separating the sheet, is approximately 3, with a minimum edge strength of about 100 MPa. The low shape factor means the distribution of edge strength is fairly broad. This performance is problematic in applications where minimum edge strength is important for reliability reasons.

SUMMARY

In one embodiment, a method of separating a thin sheet of brittle material is disclosed comprising forming a full body crack in a sheet of brittle material comprising a first surface, an opposing second surface and a thickness between the first and second surfaces equal to or less than about 1 mm, the full body crack intersecting the first and second surfaces, irradiating the full body crack with a laser beam, traversing the laser beam over the first surface along a predetermined path to propagate the full body crack along the predetermined path and separate the sheet of brittle material into at least two sub-sheets of brittle material and wherein the full body crack is propagated without forced fluid cooling of the sheet of brittle material. The laser beam preferably comprises a wavelength between about 9 µm and 11 µm, and may be, for example, a CO2 laser at a nominal wavelength of 10.6 µm. In some embodiments, a thermal conductivity of an ambient atmosphere in contact with the sheet of brittle material is greater than about 0.024 W/m/K. For example, the ambient atmosphere may comprise a large concentration of a high thermal conductivity gas.

A length of the beam footprint where the beam intersects with the first surface and parallel with the predetermined path is preferably greater than a speed of the traverse of the beam over the first surface of the brittle material multiplied by $(\rho c_p d^2)/4\kappa$ where $\rho$ is the density of the glass plate, $c_p$ is the specific heat of the glass plate, $\kappa$ is the thermal conductivity of the glass plate and d is the thickness of the glass plate.

In some embodiments, an external tension force can be applied perpendicular to the pre-determined path during the traversing of the laser beam. For example, the brittle material, such as a thin glass sheet, can be wound on several spools, and the distance between the spools increased without increasing a length of the brittle material between the spools (or increasing the length of brittle material between the spools less than the increase in distance between the spools) to apply a tension force. However, two spools need not be used and is merely illustrative.

In some embodiments, traversing the laser beam comprises passing the beam footprint only a single pass along the pre-determined path. In other embodiment, traversing the laser beam over the surface of the surface of the brittle material comprises a plurality of repetitive passes over the predetermined path. In such cases, the full body crack that separates the sheet of brittle material into sub-sheets is propagated along the predetermined path only after a plurality of passes has been performed. The use of a plurality of passes is effective in separating out a closed figure, such as a generally rectangular shape (e.g. a rectangle with rounded corners).

Once the sheet of brittle material has been separated into sub-sheets, at least one of the sub-sheets can be further processed by depositing a dielectric or a semiconductor material on at least one of the at least two sub-sheets. For example, one of the sub-sheets can have one or more thin film transistors deposited thereon by known deposition techniques (e.g. evaporation, sputtering, etc.).

In another embodiment, a method of separating a glass sheet is described comprising forming an initial flaw in a surface of a glass sheet having a thickness equal to or less than about 1 mm, irradiating the initial flaw with a laser beam comprising a wavelength between 9 µm and 11 µm, traversing the laser beam over the surface of the glass sheet along a predetermined path in a plurality of cycles between a start point and a stop point to heat the predetermined path without forced fluid cooling and wherein a full body crack is propagated along the predetermined path only after the plurality of cycles, and the glass sheet is separated into at least two sub-sheets. In some instances, the laser beam is extinguished between cycles. Preferably, the laser beam is defocused at the surface of the glass sheet. The pre-determined path may comprise a curve, and in some embodiments the predetermined path is a closed path. Once the sheet of glass has been separated into sub-sheets, a dielectric or a semiconductor material can be deposited on at least one of the at least two sub-sheets.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1A:
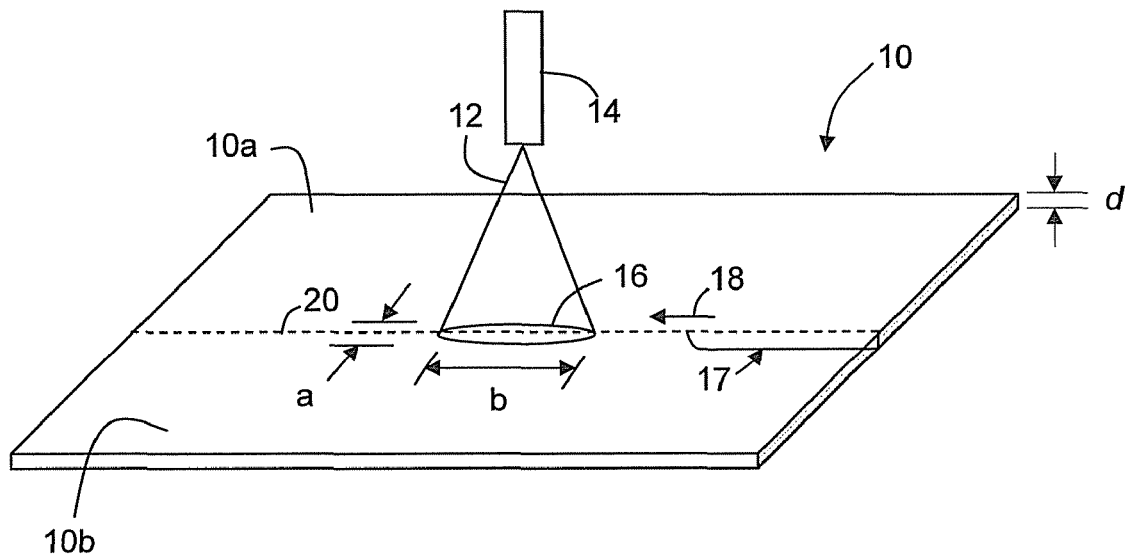
FIG. 1A is a perspective view of a sheet of brittle material being separated in accordance with an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein, full body cutting refers to forming a crack in a sheet of brittle material (e.g. a thin glass sheet) that extends through the thickness of the material and across a dimension of the material such that the material is cleaved into separate pieces.

As used herein, forced fluid cooling refers to cooling a brittle material by directing a confined flow of a fluid, such as air or water trough a nozzle, onto a substrate to cool the substrate. For example, a jet of pressurized water or air may be directed at a prescribed region of a glass plate behind a laser beam to quench the heated glass. Forced fluid cooling is to be distinguished from ambient cooling, or general cooling of the substrate through contact with the ambient atmosphere.

Although the methods disclosed herein may be applied to a variety of thin brittle materials, such as glass, glass ceramics, ceramics or other similar materials (e.g. semiconductor wafers), one prominent use is the cutting of glass substrates used in display applications. This category includes, but is not limited to, television displays, computer displays, cell phone displays, and so forth. Consequently, the following description will be presented in the context of thin sheets of glass, with the understanding that the methods described can be applied to other materials.

In a conventional process for laser cutting of glass sheets, a score is first formed in the glass sheet along a pre-determined cutting path to create an initial flaw in the glass that extends substantially across the sheet, but not through the thickness of the sheet. The score may be made using a mechanical instrument, such as a hard scribe or wheel. A bending moment is then applied to the glass to induce a tensile stress along the score to create a crack ("vent crack" or "vent") that propagates through the thickness of the sheet. In an alternative approach, the score may be produced by a laser beam. Again, a bending moment is applied to separate the sheet. In still another approach, a laser beam is traversed over an initial flaw (such as a nick at an edge of the sheet) to induce a crack at the flaw and then over the surface of the glass sheet along the cutting path to propagate the crack through the body of the glass and across a dimension of the sheet. The traversing laser beam is closely followed by a thin jet of a cooling fluid, typically water, to quench the heated glass and increase the stress, thereby driving the crack through the body of the glass and separating the sheet into several individual panes.

The edge strength of glass substrates cut using a laser may vary widely, with a corresponding variation in the Weibull modulus, m, sometimes referred to as the "shape factor". Fracture analysis shows a dominating presence of twist hackle in the cut edges of low strength glass substrate samples separated according to conventional methods. Twist hackle occurs when a torsional stress (twisting) is applied to a material during the time a crack is propagating through the material. During laser separation of glass, twist hackle can be produced on the surfaces of the cut edge when uneven laser heating of the glass occurs. Twist hackle can be eliminated by balancing the temperature through the thickness of the glass substrate, which can result in a significant increase in the median strength of the cut sheet as well as the minimum edge strength and shape factor.

Silica-based glass substrates suitable for use in display applications strongly absorb light in a wavelength range from about 9 μm to about 11 μm, and the penetration depth of the such light in the glass substrates is usually limited to no more than about several wavelengths (e.g. 20-30 microns or less). It should be noted, however, that different glasses may strongly absorb at different wavelengths, and so the wavelength range needed for strong absorption may vary outside this range. A $CO_2$ laser emits light at 10.6 um wavelength, well within the 9-11 μm range. Thus, a beam emitted by a $CO_2$ laser is strongly absorbed by silica-based glass, and can be regarded as a surface heater. Heating within the bulk of glass substrates irradiated with a strongly absorbed laser beam, such as a $CO_2$ laser, can only be obtained through thermal conduction from the surface. In a one-dimensional heat conduction model, the time, $\tau_{depth}$, needed for the temperature to equilibrate through the sheet thickness can be estimated using the following equation:

$$\tau_{depth} \approx \frac{\rho c_p}{4\kappa} d^2 \quad \quad 1)$$

where $\rho$ is the glass density, $c_p$ is the specific heat of the glass, $\kappa$ is the heat conductivity of the glass, and d is the glass thickness.

As evident from equation 1) above, $\tau_{depth}$ increases as the square of the glass thickness. As an example, for a glass substrate with a thickness of 0.63 mm, $\tau_{depth}$ is about 0.2 seconds. For the same glass at a 0.2 mm thickness, $\tau_{depth}$ decreases to 0.02 seconds, an approximately ten-fold reduction in time. Thus, as the glass sheet becomes thinner, high stress can be achieved in the sheet in a shorter amount of time, and without resorting to the application of a quenching fluid. The low volume of glass in the body of the sheet for a given surface area results in a higher heat loss from a thin sheet than for a thick sheet.

At present, a typical glass thickness for liquid crystal display (LCD) TV substrates, cell phones display substrates, and other hand-held devices, is less than about 1 mm, and typically about 0.7 mm. However, the industrial trend is toward thin glass substrates of 0.5 mm or less. As the thickness d of the glass substrates decreases, the time needed to balance (equilibrate) the temperature over the glass thickness is significantly reduced.

Since most of the energy from a strongly absorbed laser beam is absorbed at the surface of most silicate glasses, the surface layer can easily be heated to the strain or softening point of the glass material if the power of the beam is too high, or the residence time of the beam on the surface is too long. Because separation of the glass is dependent on the generation of high stress in the glass, heating of glass substrates above the softening point can subsequently decrease cutting speed by relieving stress in the glass. To prevent over-heating, the laser beam can be shaped in a way that balances thermal conduction through the thickness of the material. For example, the beam may be shaped into an elongated form using a cylindrical lens (a combination of positive-negative or positive-positive cylindrical lenses with crossed optical axes), or scanning techniques using optical scanners or rotating mirrors that effectively irradiate extended lengths of the substrate without the need to modify the shape of an otherwise circular beam.

FIG. 1 is a schematic showing laser cutting of glass sheet 10 using an elongated laser beam 12 produced by laser 14 without forced fluid cooling. The beam irradiates a "footprint" 16 on the glass sheet having a major axis oriented along the cutting direction 18, and a minor axis perpendicular to the major axis, wherein the boundaries of the footprint are defined wherein the intensity of the beam has been reduced to a value of $1/e^2$ the peak intensity. The lengths of the major and minor axes of footprint 16 are denoted as b and a, respectively. The length b of the beam footprint on the glass sheet is greater than the traverse speed v of the beam (the speed of the "footprint", or area over which the beam impinges) multiplied by $\tau_{depth}$. The laser cutting path is shown as dashed line 20, and the beam is shown moving to the left.

Figures 2A, 2B, 2C:
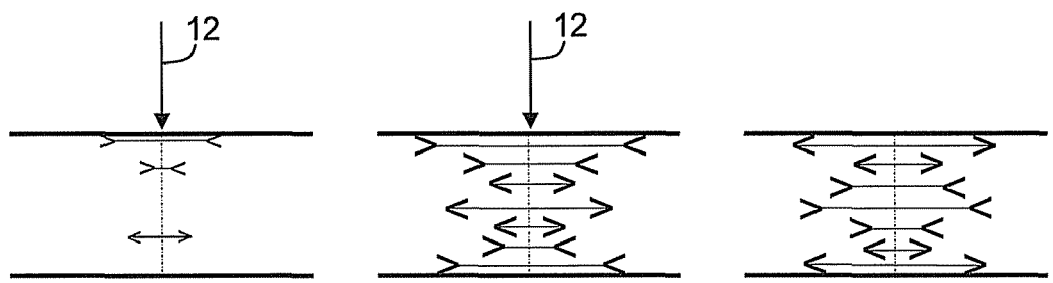
FIG. 2A-2C are cross sectional views of a sheet of glass undergoing laser separation, and indicating the development of stress in the sheet as a result of a progression of heating with a laser.

FIGS. 2A-2C illustrate the stress profile of a small strip of glass along the laser cutting path, the width of which is roughly twice the length a of the elongated (e.g. elliptical) beam minor axis. The stress profile through the glass thickness is shown at different times as the laser passes over the glass. FIG. 2A depicts the stress field present in the glass at the instant when the laser beam 12 begins to heat the irradiated surface and traverses over the surface. The figure shows that a compressive stress (indicated by the inward pointing arrows) develops close to the irradiated glass surface and a tensile stress develops farther below the surface (indicated by the outwardly pointing arrows—the length of the line connecting the arrows indicates relative magnitude of the stress). This is easily understood by considering that as the glass locally heats, it expands, but is constrained by the cooler glass surrounding it. Thus, a compressive stress develops within the heated portion. The transverse time of the laser along the cutting line of the glass surface is determined by b/v, where, as before, v is the transverse speed of the laser beam relative to the glass substrate.

At a next instant in time, illustrated in FIG. 2B, heat from the irradiated surface is conducted through the thickness of the glass, and the stress profile is compressive at the outer surfaces of the glass (both the irradiated surface and the opposite surface) and tensile in the central portion of the glass sheet.

Finally, FIG. 2C depicts the same region of glass shortly after the laser beam has moved away from the glass strip. Due to heat loss at the glass surfaces, the stress profile becomes tensile at the outer surfaces of the glass, and compressive within the central region of the glass. The stress profile of FIG. 2C, given enough temperature difference between the heated region and the rest of the glass substrate, is responsible for crack propagation and sheet separation.

Figure 1B:
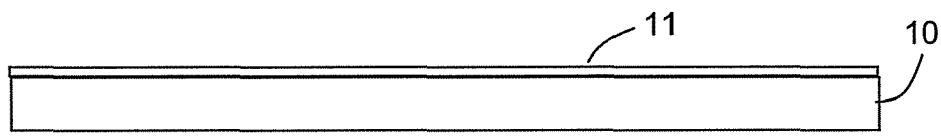
FIG. 1B is an edge view of a glass sheet comprising a thin film layer that can be separated as depicted in FIG. 1A.

Returning to FIG. 1A, as the laser beam traverses along the pre-determined path 20, full body crack 17 propates across sheet 10 until sheet 10 is separated into sub-sheets 10a and 10b. As depicted in FIG. 1B Sheet 10 may optionally comprise a thin film layer 11, such as a metal oxide layer (e.g. indium tin oxide—ITO), wherein the full body crack that separates the sheet of brittle material into sub-sheets, also separates the thin film layer. This film layer 11 may comprise multiple layers. The one or more thin film layers may, for example, comprise a thin film device such as a thin film transistor. Alternatively, the thin film layer may be a barrier layer or passivation layer.

From the above description it becomes clear that cutting thick sheets of glass (i.e. greater than about 1 mm) requires rapid cooling (quenching) of the glass to generate sufficient stress in the glass to cleave it. However, when the thickness d of the glass is sufficiently thin, i.e. equal to or less than about 1 mm, full body cleaving (cleaving through the entire thickness of the sheet) can be accomplished without forced cooling along the path described by the laser beam as it traverses the sheet.

Figure 4:
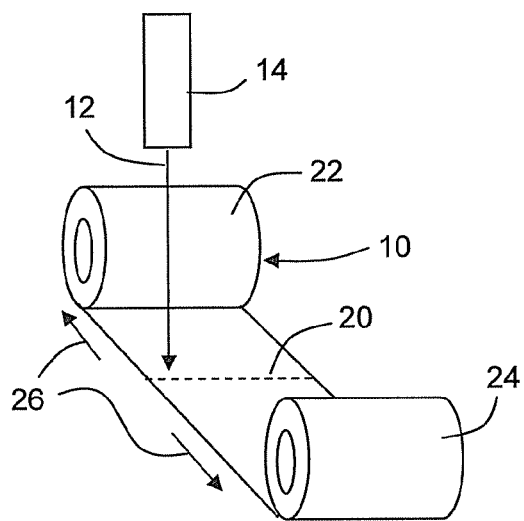
FIG. 4 is a perspective view of a spool-to-spool transport system for very thin sheets of glass, wherein the sheet of glass transferred between the spools is separated in accordance with embodiments of the present invention.

Thin glass substrates rolled into a cylindrical drum may also be cut according to methods disclosed herein. In the illustration shown in FIG. 4, glass is wound from a first drum or spool 22 to a second spool 24. A slight tension (arrows 26) is externally applied to the thin glass sheets perpendicular to cut line (pre-determined path) 20 during the separating process. That is, the tension is to be distinguished from tension that is formed by heating and/or cooling the glass. For example, the tension may be applied by moving spools 22, 24 apart. The applied tension is to be distinguished from thermally developed stress (i.e. resulting from heating by the laser). Laser cutting can be carried out at the desired length by non-contact laser scoring to form an initial flaw, followed by $CO_2$ laser cutting without forced cooling to propagate a full body crack across the glass sheet. The applied tension serves a dual purpose. First, the applied tension facilitates an increase in laser cutting speed. The applied tension may also be used to maintain full body crack propagation in the desired cutting direction, since crack propagation is always perpendicular to the applied tensile stress.

In the above examples, for the purpose of efficient laser heating while keeping the glass temperature below the strain point, an elongated laser beam generated by static optics was used. It is further possible to use optical scanner(s) and rotating optical mirrors to achieve the heating while keeping the temperature of the glass substrate below the strain point. This involves rapidly scanning the beam over a length along the cutting path. Optical scanner-based heating techniques enable cutting along any desired shape/curve as described further below.

Laser cutting from the edge of the glass substrate, without forced cooling, has been described above. It is also possible to use the technique to cut glass substrates beginning off-edge. It is believed that stress generated by laser cutting without forced fluid cooling is lower than what is obtainable with forced cooling, since water is a very efficient cooling medium. Off-edge cutting would possibly involve a water jet at the very beginning of the cut. Once the crack is being propagated, the water jet is turned off and further cutting is achieved solely by $CO_2$ laser generated stress.

Yet another improvement in cutting speed can be achieved by pre-heating the glass substrate to higher temperatures along the cutting path. Pre-heating the glass substrate reduces the amount of heating required to be supplied by the cutting laser while propagating the full body crack. For example, the glass sheet can be locally preheated along the predetermined cutting path by a flame or by a laser (either the cutting laser or another laser).

It should also be noted that although the foregoing description has been directed to the separation of glass sheets along a substantially straight cutting line, embodiments of the present invention can be applied to separation of thin glass sheets along curved and or closed paths as well.

Figure 5A:
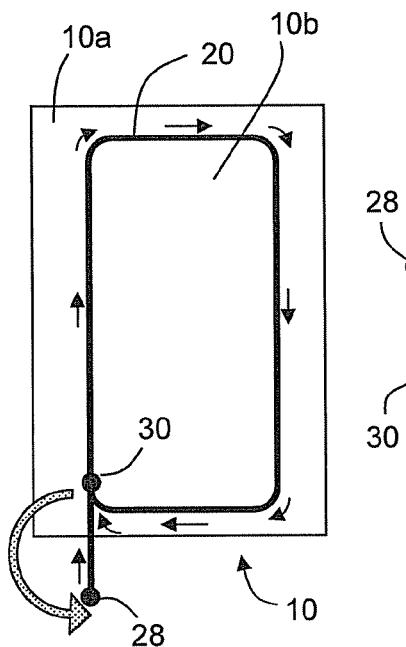
FIG. 5A-5C are top-down views of glass sheets, wherein shapes are cut from the initial (mother) sheet by rapid scanning of a laser beam along a predetermined path until a full body crack appears and propagates along the path, separating the shape.
Figure 5B:
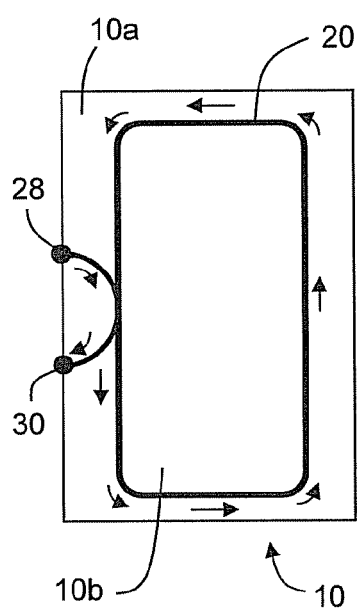
Figure 5C:
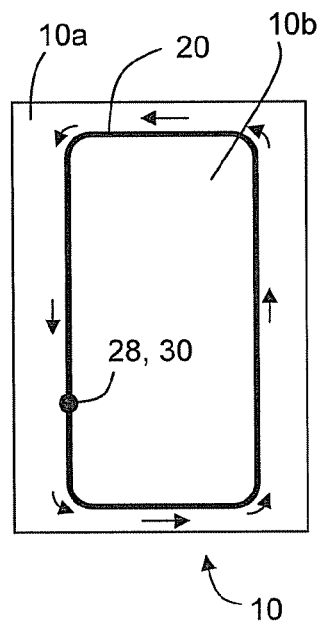

FIGS. 5A-5C show laser shape cutting of glass substrates using a galvanometer-based scanner. In accordance with the present embodiment, a defocused laser beam is rapidly scanned (indicated by the arrows) along a predetermined path 20 that traces the perimeter of a shaped part. FIGS. 5A-5C depict three non-limiting approaches to cutting generally rectangular parts (e.g. with rounded corners) from rough-cut parent glass substrates 10. Other shapes or curved paths are also possible. In FIG. 5A, an initial defect on the edge of glass substrate 10 is generated mechanically, or, in some embodiments, ablated with a focused laser beam, such as a focused $CO_2$ laser beam. The beam typically is initially positioned a short distance away from the glass substrate at a start position 28, then rapidly scanned over the edge defect, and along the pre-determined beam path 20. After rounding the fourth corner (the end position 30), the laser is turned off (extinguished) and the scanner is re-positioned to start position 28, the beam is turned back on and the cycle repeats along the same path. While the repetitive scans are taking place, and after a plurality of scans, a full-body crack is generated at the initial flaw substrate edge. The advancing crack front rapidly propagates along the laser beam path, until it encounters the already formed portion of the full body crack, and the crack front stops. A shaped cut is thus obtained, separating the parent sheet 10 into two sub-sheets 10a and 10b.

FIG. 5B is another embodiment of a scanning method wherein the scan is started from a side of the rectangular part, rather than from a corner position as shown in FIG. 5A. With the preceding exception, the process proceeds as described with respect to FIG. 5A.

FIG. 5C is still another embodiment comprising a closed-loop scan to heat the glass substrate. The start and stop positions are co-located on the scan path. The advantage of the closed loop scan method is that the scan is continuous: the laser will be kept on so long as the scan is in progress, and the initial mechanical defect is located in the path of the scanning beam. Because the defect is located off-edge, more tension is needed to generate the initial full body crack. The tension necessary to generate the initial full-body crack at the defect site can be induced by forced cooling at the defect site, wherein thereafter the scanning process and crack propagation around the pre-determined path is done without the need for forced cooling.

One of the potential applications of laser full-body cutting technique according to embodiments disclosed herein is the removal of glass edge beads formed in a down draw process. In a downdraw process, a glass ribbon is formed by feeding molten glass to a forming body, and wherein the molten glass descends from the forming body. The decent of the molten glass may be due to gravity, or a combination of gravity and a separately applied pulling force. Down draw processes include well known slot draw processes, where the molten glass descends from a slot formed at the bottom of a hollow forming body, and fusion forming processes, where the molten glass flows over the sides of the forming body, fuses and descends from the bottom of the forming body.

Figure 6:
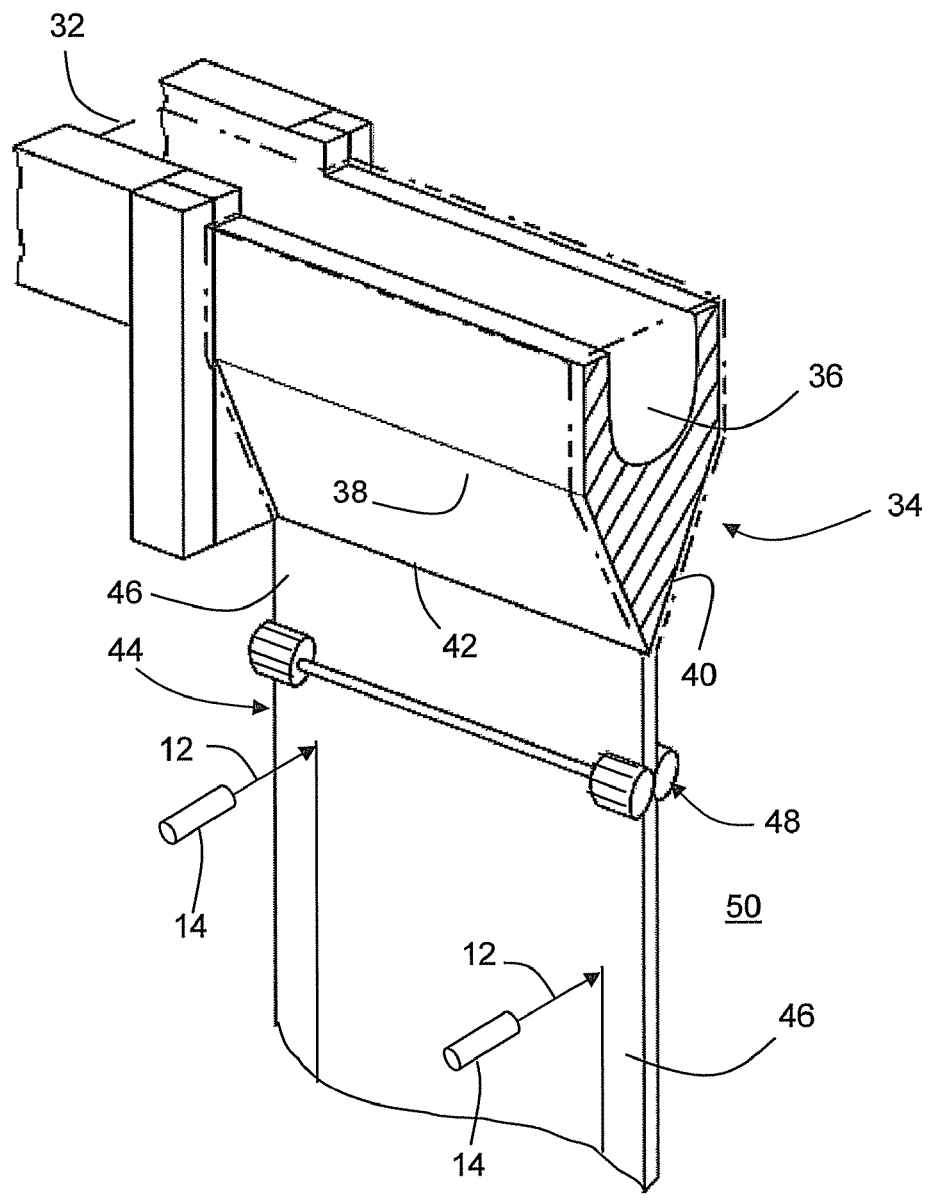
FIG. 6 is a partial cross sectional perspective view of an exemplary downdraw glass sheet forming process wherein edge portions of the thin glass ribbon produced by the process are removed in accordance with an embodiment of the present invention.
Figure 7:
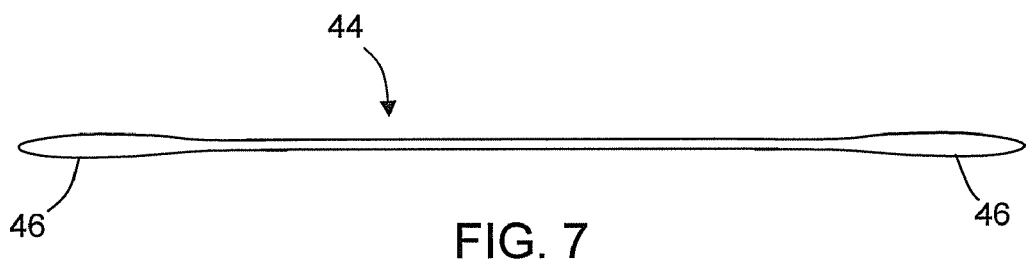
FIG. 7 is a cross sectional view of the ribbon of FIG. 6 showing the bulbous edge portions that are removed by laser separation.

In a typical fusion draw process for forming glass sheets, depicted in FIG. 6, molten glass 32 is flowed into a conduit, or forming body 34, having a trough 36 at the top of the body. The trough is open so that the molten glass can overflow the walls of the trough and flow over the outer sides of the forming body in separate streams. The forming body includes outer forming surfaces 38, 40 over which the separate streams flow. The forming surfaces 38, 40 meet at the bottom or root 42 of the forming body, and rejoin (fuse) to form a continuous thin ribbon of glass 44. Surface tension, among other forces, causes the ribbon to pull inward while the ribbon is in a viscous state just below the root, thereby reducing or attenuating the width of the ribbon, and also thickening the edges 46 into a bulbous shape (see FIG. 7 showing a cross sectional view of the ribbon of glass). As the ribbon descends, it transitions to a visco-elastic state, and eventually to an elastic state. Because the thickened edges, or beads, would produce a thickness variation of a finished sheet of glass cut from the ribbon, the beads are removed from the sheets. Process efficiency can be achieved if the beads are removed from the ribbon during the drawing process as the ribbon is pulled by pulling rollers 48 from the root. As illustrated in FIG. 6, laser beams 12 emitted by lasers 14 are directed at a location on ribbon 44 inboard of the bulbous edge portions that has cooled to an elastic state such that the edge portions are separated from the remainder of the ribbon in accordance with foregoing embodiments. However, the temperature of the ribbon is significantly higher than the room temperature (several hundreds of degrees Celsius). To obtain sufficient heat loss from the ribbon, the heat conduction of the ambient atmosphere can be improved by increasing the thermal conductivity of the ambient atmosphere 50. For example, the percentage of helium in the atmosphere can be increased. Helium has a thermal conductivity of 0.142 W/m/K, which is significantly higher than the thermal conductivity of air, which is about 0.024 W/m/K. Thus, in some embodiments, the ambient atmosphere is contact with the glass is made greater than about 0.024 W/m/K and preferably greater than about 0.1 W/m/K. Indeed, the atmosphere can be increased to comprise up to 100% helium for example, or one or more other high thermal conductivity gases, alone or in combination, to remove heat from the surface of the ribbon and create the tension needed to cut the glass.

EXAMPLE 1

In one example, a 12 watt (W) $CO_2$ laser was used to separate a 190 µm thick silicate glass substrate without forced cooling. A small flaw was first initiated at the edge of the glass using the cutting laser, modifying the beam with a 2" focal length plano-convex spherical lens. Once the initial flaw was created, a plano-convex and concave cylindrical lens was inserted into the beam path to form an elongated laser beam, and relative motion between the resulting elongated beam footprint and the substrate was increased to a terminal cutting speed of 45 mm/s. Residual stress remaining in the substrate after separation was negligible at the cutting speed.

EXAMPLE 2

A $CO_2$ laser was used to separate a Corning EAGLE XG™ glass sheet of 0.63 mm thickness without forced cooling. An initial flaw was generated at an edge of the sheet with a $CO_2$ laser operating at 6.5 watts and a 2" focal length plano-convex spherical lens. Once the initial flaw was formed, plano-concave and convex cylindrical lenses were used to form an elongated beam using the same laser. The beam was elongated to a footprint length (major axis) of 9 mm and a footprint width (minor axis) of 0.6 mm. A terminal cutting speed of 9 mm/s was achieved and the substrate was successful cleaved in a single pass of the elongated beam footprint.

EXAMPLE 3

To compare the edge strength of conventionally mechanically cut glass (score and bend technique) with glass cut using an embodiment of the present invention, three batches of 5 mm×70 mm glass strips were prepared from a parent sheet having a thickness of 0.63 mm. The coefficient of thermal expansion (CTE) of the parent sheet was about $32 \times 10^{-7}$/° C. One batch of samples was prepared by conventional mechanical scoring and bending, one batch was prepared with forced cooling (via a water jet following the elongated footprint of the cutting laser beam) and a final batch was prepared by laser cutting without forced cooling. To produce the samples without forced cooling, an initial flaw was created in the parent glass using a $CO_2$ laser operating at 6.5 watts and a 2" focal length plano-convex spherical lens. Once the initial flaw was formed, plano-concave and convex cylindrical lenses were used to elongate the beam. The elongated beam was then transversed over the initial flaw and the surface of the parent glass sheet along a predetermined cutting path. This was repeated for non-forced cooling sample. The edge strength of each of the three samples sets was tested by subjecting each sample to a 4-point bending test. The results were plotted as a distribution (Weibull) of the probability of failure versus applied stress (MPa) and shown in FIG. 3.

Figure 3:
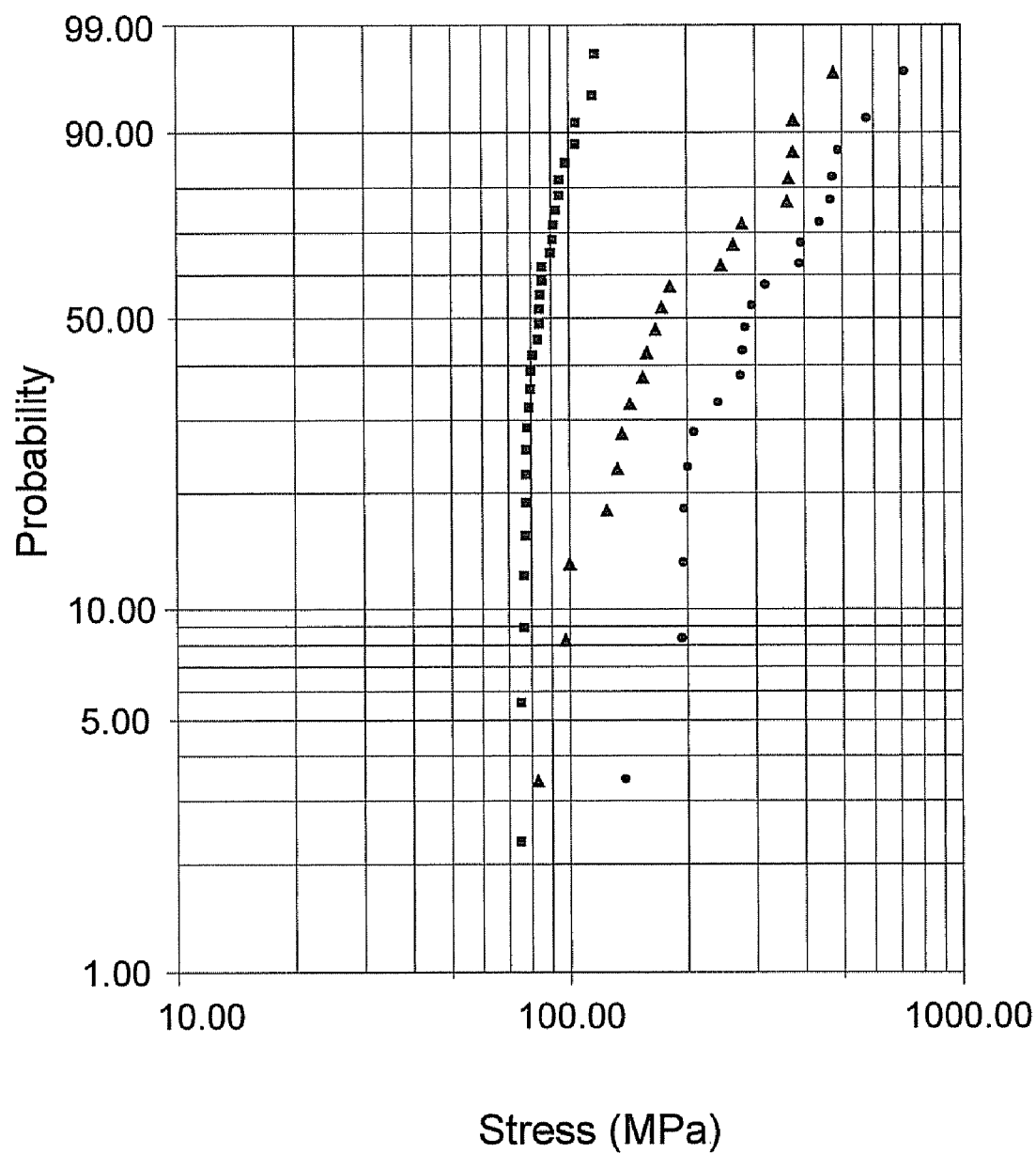
FIG. 3 is a plot of the Weibull distribution of failure strength for three families of sample—samples that were mechanically separated, samples that were laser separated with forced fluid cooling of the laser heated path, and samples that were laser separated without forced fluid cooling of the laser heated path.

FIG. 3 shows that samples cut with a cooling water jet (Batch 2—indicated with triangles, center) and without a cooling water jet (Batch 1—indicated with circles, far right) both outperformed the mechanical cut samples (Batch 3—indicated by squares, far left) in terms of strength. However, the laser cut samples without using forced cooling exhibited an average strength of about 380 MPa while the laser cut samples with forced cooling exhibited an average strength of about 240 MPa.

EXAMPLE 4

A $CO_2$ laser was used to separate soda-lime glass substrates of 1"×0.5" and with a 0.7 mm thickness were laser cut without forced cooling. The soda lime glass had a coefficient of thermal expansion (CTE) of about $80 \times 10^{-7}$/° C.

An initial flaw was generated with the $CO_2$ laser running at 6.5 watts and a 2" focal length plano-convex and concave lens. After the initial flaw was formed, a plano-concave cylindrical lens was used to elongate the laser beam, and the beam was traversed over the initial flaw and the surface of the glass substrate along a predetermined cutting path to propagate a full body crack along the cutting path. A terminal cutting speed of 25 mm/s was achieved and the sample was successfully separated.

EXAMPLE 5

In this example, a scanning method as shown in the embodiment of FIG. 5A is used in the shaped cutting process. A 75 um Corning code 0211 glass was used as the parent substrate. The parent glass substrate was approximately 120 by 150 mm. The laser beam was emitted from a $CO_2$ laser and was about 2 mm in cross sectional diameter. The laser power was about 80 watts, and the scanning speed was about 1500 mm/s.

The shape being cut was about 100×120 mm in dimension, with a 5 mm corner radius. Crack propagation was observed less than 1 second after scanning with the laser beam was started. The scanning process was stopped once crack propagation was observed.

Figure 8:
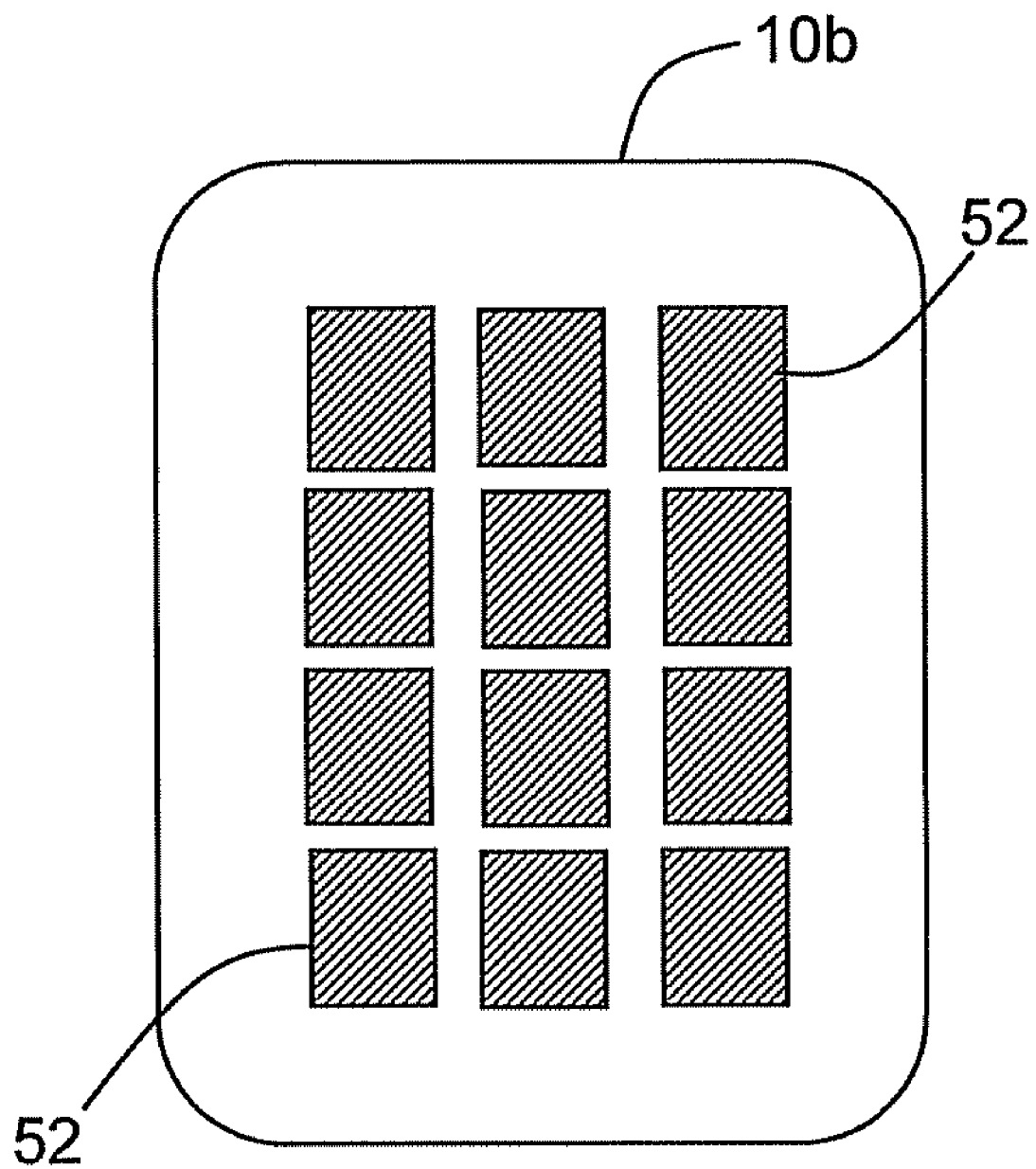
FIG. 8 is a top view of a sub-sheet cut from a parent sheet of brittle material, such as glass, and wherein the sub-sheet comprises one or more layers of a thin film material deposited thereon.

Once the full body crack has propagated along the predetermined path, sheet 10 becomes separated into sub-sheets 10a and 10b. For example, one sub-piece can be a shape as described above and shown in FIG. 8. One or more layers of materials 52, such as dielectrics or semiconductor materials, can thereafter be deposited on one of the sub-sheets (such as the generally rectangular sub-piece) according to conventional deposition processes (e.g. evaporation, co-evaporation, sputtering, etc.). The layers of material can comprise, for example, thin films such as ITO or a thin film transistor, and the sub-piece can be used in an electronic device, such as a display device.

Alternatively, the thin film (or a thin film device) may be deposited on the glass sheet prior to the separation into two sub-sheets, and wherein the separation separates the thin film (or thin film device) comprising sub-sheet from the rest of the parent sheet.

Although the separation of glass sheets has been described, embodiments of the present invention may also be applied to separating other brittle materials, such as ceramics, glass ceramics or even semiconductor materials.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of separating a thin sheet of brittle material comprising:
   forming a full body crack in a sheet of brittle material comprising a first surface, an opposing second surface and a thickness between the first and second surfaces equal to or less than about 1 mm, the full body crack intersecting the first and second surfaces;
   irradiating the full body crack with a laser beam;
   traversing the laser beam over the first surface along a predetermined path to propagate the full body crack along the predetermined path and separate the sheet of brittle material into at least two sub-sheets of brittle material; and
   wherein the full body crack is propagated without forced fluid cooling of the sheet of brittle material.

2. The method according to claim 1, wherein the laser beam comprises a wavelength between about 9 μm and 11 μm.

3. The method according to claim 1, wherein a thermal conductivity of an ambient atmosphere in contact with the sheet of brittle material is greater than about 0.024 W/m/K.

4. The method according to claim 1, where the beam forms an elongated beam footprint at the first surface, and a length of the beam footprint parallel with the predetermined path is greater than a speed of the traverse multiplied by $(\rho c_p d^2)/4\kappa$ where $\rho$ is the density of the glass plate, $c_p$ is the specific heat of the glass plate, $\kappa$ is the thermal conductivity of the glass plate and d is the thickness of the glass plate.

5. The method according to claim 1, further comprising applying an external tension force perpendicular to the predetermined path during the traversing.

6. The method according to claim 1, wherein the sheet of brittle material is a glass sheet.

7. The method according to claim 1, wherein the traversing comprises a single pass along the predetermined path.

8. The method according to claim 1, wherein the traversing comprises a plurality of passes over the predetermined path.

9. The method according to claim 1, wherein at least a portion of the sheet of brittle material is disposed on a spool.

10. The method according to claim 8, wherein the full body crack is propagated along the predetermined path only after the plurality of passes.

11. The method according to claim 1, wherein the sheet of brittle material comprises a thin film deposited thereon.

12. The method according to claim 11, wherein the thin film comprises ITO.

13. The method according to claim 1, further comprising depositing a dielectric or a semiconductor material on at least one of the at least two sub-sheets of brittle material.

14. A method of separating a glass sheet comprising:
forming an initial flaw in a surface of a glass sheet having a thickness equal to or less than about 1 mm;
irradiating the initial flaw with a laser beam comprising a wavelength between 9 μm and 11 μm;
traversing the laser beam over the surface of the glass sheet along a predetermined path in a plurality of cycles between a start point and a stop point to heat the predetermined path without forced fluid cooling; and
wherein a full body crack is propagated along the predetermined path only after the plurality of cycles, and the glass sheet is separated into at least two sub-sheets.

15. The method according to claim 14, wherein the laser beam is extinguished between cycles.

16. The method according to claim 14, wherein the laser beam is defocused at the surface of the glass sheet.

17. The method according to claim 14, wherein the predetermined path comprises a curve.

18. The method according to claim 14, wherein the predetermined path is a closed path.

19. The method according to claim 14, further comprising depositing a dielectric or a semiconductor material on at least one of the at least two sub-sheets.

20. The method according to claim 14, wherein the glass sheet comprises a thin film layer deposited thereon prior to separating the glass sheet into at least two sub-sheets.

* * * * *